United States Patent [19]

Licciardi et al.

[11] Patent Number: 4,905,179
[45] Date of Patent: Feb. 27, 1990

[54] CMOS CELL FOR LOGIC OPERATIONS WITH FAST CARRY

[75] Inventors: Luigi Licciardi, Almese; Alessandro Torielli, Turin, both of Italy

[73] Assignee: CSELT - Centro Studi e Laboratori Telecomunicazioni S.p.A., Turin, Italy

[21] Appl. No.: 186,895

[22] Filed: Apr. 27, 1988

[30] Foreign Application Priority Data

May 20, 1987 [IT] Italy .................. 67440 A/87

[51] Int. Cl.$^4$ .................. G06F 7/50; G06F 7/52
[52] U.S. Cl. .................. 364/786; 364/758
[58] Field of Search .................. 364/768, 784–787, 364/750.5, 758

[56] References Cited

U.S. PATENT DOCUMENTS

| | | | |
|---|---|---|---|
| 4,601,007 | 7/1986 | Uya et al. | 364/784 |
| 4,621,338 | 11/1986 | Uhlenhoff | 364/786 |
| 4,685,079 | 8/1987 | Armer | 364/784 |
| 4,706,210 | 11/1987 | Snelling et al. | 364/758 |
| 4,739,503 | 4/1988 | Armer et al. | 364/786 |
| 4,768,161 | 8/1988 | Béchade et al. | 364/758 |
| 4,817,030 | 3/1989 | Lee et al. | 364/784 |

OTHER PUBLICATIONS

Oberman, R. M. M, *Digital Circuits for Binary Arithmetic*, pp. 46–52, 1979, Halsted Press, New York.

*Primary Examiner*—David L. Clark
*Assistant Examiner*—Dale M. Shaw
*Attorney, Agent, or Firm*—Herbert Dubno

[57] ABSTRACT

The elementary adder, as far as carry propagation is concerned, has two circuit branches: the first is an inverter (II) followed by a transfer gate (T1, T2) activated when two operands have opposite logic levels, in which case it transfers complemented input carry Cin to the output CoutN; the second consists of a 4-transistor series cirucit, two P-MOS (T3, T4) and two N-MOS (T5, T6) geenrating carry output CoutN complemented when the two operands have equal logic levels.

7 Claims, 4 Drawing Sheets 4,905,179

CMOS CELL FOR LOGIC OPERATIONS WITH FAST CARRY

FIELD OF THE INVENTION

The present invention relates to integrated circuits, and, more particularly to an elementary C-MOS cell for executing logic addition with fast carry propagation. This adder is the basic element of complex arithmetic logic units.

BACKGROUND OF THE INVENTION

In many applications the requirement of increasing computation speed renders the use of traditional arithmetic logic circuits more difficult.

The most-widely used technique in designing arithmetic logics is that of implementing minimized Boolean equations obtained by applying Karnaugh maps to the truth tables of the operations to be carried out, by suitable combinations of known elementary logic gates, such as NAND, NOR, NOT, EX-OR. Each elementary logic gate is then converted into the equivalent transistor circuit in the desired technology, e.g. integrated MOS technology. Finally the geometric dimensioning of the individual transistors of the structure to be integrated is effected. For example, in the case of an adder a structure is obtained consisting of equal addition cells, whose number is equal to the operand size and wherein the carry propagates from the least weight cell to the highest weight cell, through the various logic levels of each cell. The result will be stable at the output only at the end of the carry signal path. Hence carry signal propagation time limits computation speed, mainly when the operands have considerable size, and the number of levels of the logic to be traversed is high.

This is mainly due to the fact that in known circuits, the carry signal at the output of a cell generally feeds a considerable number of transistor gates of the subsequent cell. Thus the switching time is high because of the parasitic capacity, equivalent to the number of gates, seen by the output of the carry signal at the input of each the subsequent cell. The parasitic capacity is proportional to the number of transistor gates at the input.

OBJECT OF THE INVENTION

It is the object of the invention to provide a logic circuit overcoming this drawback.

SUMMARY OF THE INVENTION

This object is achieved by the present invention in an elementary C-MOS cell executing logic addition, which is the basic element of even complex arithmetic logics and is directly obtained from the truth table of the adding operation by exploiting as much as possible the electrical properties of the C-MOS technology, without utilizing Karnaugh maps, and wherein the number of P or N type MOS transistor used is considerably reduced, thus reducing also the number of logic levels the carry signal is to tranverse and the number of transistor gates to be driven at the input of each logic level. In this way the carry signal can propagate very quickly inside the adder.

The circuit provided by the present invention is based on the concept that, as can be seen from the truth table of the logic binary addition provided below, for $A=B$, $Cout=A=B$; for $A \neq B$, $Cout=Cin$. Hence in each cell of the adder a logic circuit is created using a limited number of transistors for generating a carry signal in accordance with said these relationships. The truth table of the logic binary addition carried out by the cell of a carry-propagating adder (the so-called full-adder) is as follows:

| A | B | Cin | Cout | S |
|---|---|-----|------|---|
| 0 | 0 | 0 | 0 | 0 |
| 0 | 0 | 1 | 0 | 1 |
| 0 | 1 | 0 | 0 | 1 |
| 0 | 1 | 1 | 1 | 0 |
| 1 | 0 | 0 | 0 | 1 |
| 1 | 0 | 1 | 1 | 0 |
| 1 | 1 | 0 | 1 | 0 |
| 1 | 1 | 1 | 1 | 1 | where A, B are the operands, Cin is the carry of the preceding cell, Cout is the generated carry and S is the result.

An elementary cell for executing additions, taking into account the carry, between two operand bits with carry propagation, comprises:

a first EX-OR logic gate which receives the operand bits;

a first inverter which receives a carry input;

a second inverter which receives the output of the first EX-OR logic gate;

a first transfer gate which receives at the transfer input the output of said first inverter, and which is controlled by input and output logic levels of said second inverter;

a second EX-OR logic gate which receives input carry and the output of said second inverter and supplies the addition result;

a first pair of series P-MOS transistors and a second pair of series N-MOS transistors, the first and second pairs being connected in series between two reference voltages, the bit of a first operand being brought to the gate of a transistor of both pairs, the bit of a second operand being brought to the gate of the other transistor of both pairs, the common node of said two pairs being connected to the output of said first transfer gate and supplying the complemented output carry.

The first transfer gate can consist of a P-MOS transistor in parallel with an N-MOS transistor. The input of the second inverter is sent to the gate of N-MOS transistor and the output of the second inverter to the gate of P-MOS transistor of the transfer gate.

The first or second EX-OR logic gates basically can consist of:

a second transfer gate;

a first P-MOS transistor whose channel is connected between the output and the gate of a P-MOS transistor of the second transfer gate; and a second N-MOS transistor whose channel is connected between the output and the gate of an N-MOS transtor of the second transfer gate, the input of the latter being connected to the gates of said first and second transistors. The transfer input of the second transfer gate is supplied with a first input datum, while the transistor gates of the second transfer gate being supplied with the true and complemented values respectively of a second input datum of the logic EX-OR gate, whose output is the transfer output of the second transfer gate.

Such cells can be cascaded for carry propagation. Bits of the first and second operands can be sent to the gate of the relevant transistor of said first and second pairs, true in cells of a first type occupying even positions and complemented in cells of the second type occupying odd positions (2n+1).

In the second logic EX-OR gate the input carry can be supplied true to the gate of P-MOS transistor and complemented to the gate of N-MOS transistor of the second transfer gate in a first type of elementary cell, while the input carry is supplied complemented to the gate of P-MOS transistor and true to the gate of N-MOS transistor of the second transfer gate in the second type of element cell.

An adding circuit of the aforedescribed type can also perform a supplementary subtraction function. It can also comprise at one of the two inputs of each elementary cell a further logic EX-OR gate, an input of which receives an operand bit. The second input of the logic EX-OR gates receives an addition/subtraction select signal, also supplied as input carry to the first elementary cell.

A multiplying circuit of the parallel-parallel type can be made up of such elementary cell and implement the product of two data and of sizes I and J respectively, available in parallel form, and can obtain the result still in parallel form. Such cells are matrix-connected. At the input of each cell a NAND gate is provided. The inputs of the latter receive the two data of the corresponding position in the matrix. A third inverter feeds one of the two operand inputs of the cell, the second input of each cell receiving a result output of the upstream cell which represents the propagation direction of the result. The carry input of each cell receives the output carry of the upstream cell in the carry signal path.

In the carry signal path there are alternately used cells of the first and second types. The input and output of the third inverter are supplied to the gates of the transistors of the second transfer gate of the first EX-OR logic gate.

In the first EX-OR logic gate, in case of an elementary cell of the first type, the gate of P-MOS transistor of the second transfer gate is supplied with the input of the third inverter and the gate of N-MOS transistor with the output of the third inverter, while in case of an elementary cell of the second type, the gate of the P-MOS transistor of the second transfer gate is supplied with the output of the third inverter and the gate of the N-MOS transistor with the input of the third inverter.

BRIEF DESCRIPTION OF THE DRAWING

The above and other objects, features and advantages of my invention will become more readily apparent from the following description, reference being made to the accompanying highly diagrammatic drawing in which.

The characteristics of the present invention will be made more evident by the description of two embodiments thereof, and of their combinations given by way of non-limiting example, and by the annexed drawings wherein.

SPECIFIC DESCRIPTION

Figure 1:
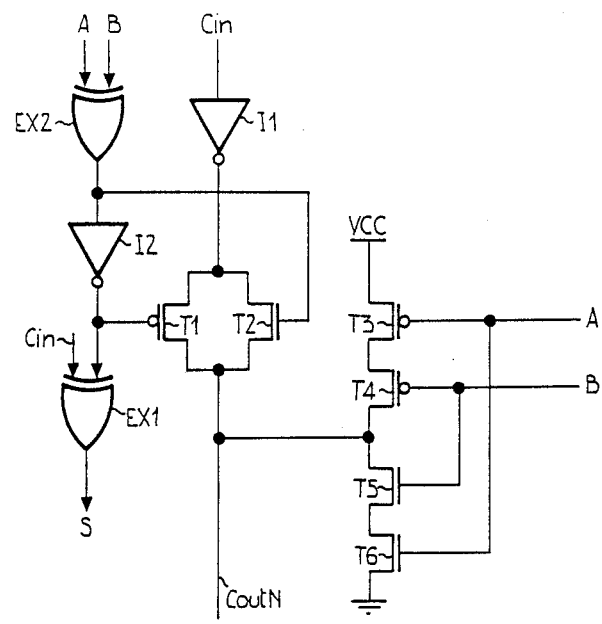
FIG. 1 is a general circuit diagram of an elementary adding cell with the circuits which generate and propagate the carry signal, as provided by the invention.

In FIG. 1 T1, T3, T4 denote P-channel MOS transistors, while T2, T5, T6 denote N-channel MOS transistors. I1, I2 denote logic inverters, EX1, EX2 EX-OR logic gates implemented with MOS transistors interconnected in a way which will be hereinbelow described.

The channels of transistors T3, T4, T5, T6 are connected in series between supply voltage Vcc and ground. Operand A is sent to T3 and T6 gates while operand B is sent to T4 and T5 gates.

The channels of transistors T1 and T2 are connected in parallel to form a controlled transfer gate, permitting or preventing transfer of the input data as a function of the logic level at transistor gates.

Operands A and B are sent to EX2 inputs generating at the output a signal going to the active logic level if $A \neq B$; then this signal is applied directly to T2 gate and through inverter I2 to T1 gate.

Carry signal Cin is applied to transfer gate input through inverter I1 (necessary to carry out the decoupling function), while the output of said gate is connected with the junction point between T4 and T5 channels to generate complemented carry signal CoutN.

Carry signal Cin and I2 output are sent to EX1 inputs to generate result S.

The part of FIG. 1 circuit generating result S implements the following logic function (which can be deduced from the truth table above):

$$S = ((A \text{ EX-OR } B) \text{ EX-OR } Cin)$$

When $A = B$, transfer gate is inhibited, while the output of circuit branch formed by transistors T3, ... T6 carries the input value complemented, denoted by CoutN.

When on the contrary $A \neq B$, circuit branch T3, ... T6 is inhibited, while transfer gate is enabled, supplying the output with complemented value of input Cin, i.e. still CoutN.

The only difference with respect to the truth table shown above is that a complemented value of carry is always generated at the output Cout, instead of the true one. The insertion of a further inverter in the carry propagation line to recover the correct polarity is not convenient, since said inverter would introduce a further delay just in the circuit point where the maximum signal propagation speed is required. Inverter I1 cannot be eliminated for decoupling reasons.

Then while implementing an N-elementary cell adder, this logic level inversion is counterbalanced by alternately connecting two elementary cell types, basically similar to that shown in FIG. 1, and which present a number of circuit adjustments, effected in order to avoid further delays.

FIG., 2 shows a pair of adjacent elementary cells, presenting said circuit adjustments, denoted respectively by CEL1, used in even positions (2n), and CEL2, used in odd positions (2n+1) of the adder. For CEL1 and CEL2 only the variations with respect to the cell of FIG. 1 are described, while equal parts are denoted by the same references used in FIG. 1.

An inverter I10 is introduced in CEL1 to supply also EX-OR EX2 with the complemented value of one of the two operands, e.g. B, for reasons which will be made clearer hereinbelow; EX-OR EX1 is also given the complemented value CinN(2n), extracted at the output of inverter I1.

In CEL2 the complemented values of operands A, B are sent to the series of transistors T3, ... T6 through inverters I11, I12 respectively. The complemented value of operand B, at the output of I12, is also sent to a third input of EX2. In the cells of odd positions (2n+1), by complementing the inputs to the series of transistors T3, ... T6 the correct carry polarity at the output Cout(2n+1) is recovered, in case of A=B, without introducing additional delays in the carry propagation line. Besides the two inputs to gate EX1, extracted from input and output of inverter I1, are interchanged: in this way gate EX1 nominally carries out EX-NOR logic functions, yet since input carry Cin(2n+1) is complemented, correct polarity of result S(2n+1) is also recovered.

Figure 3:
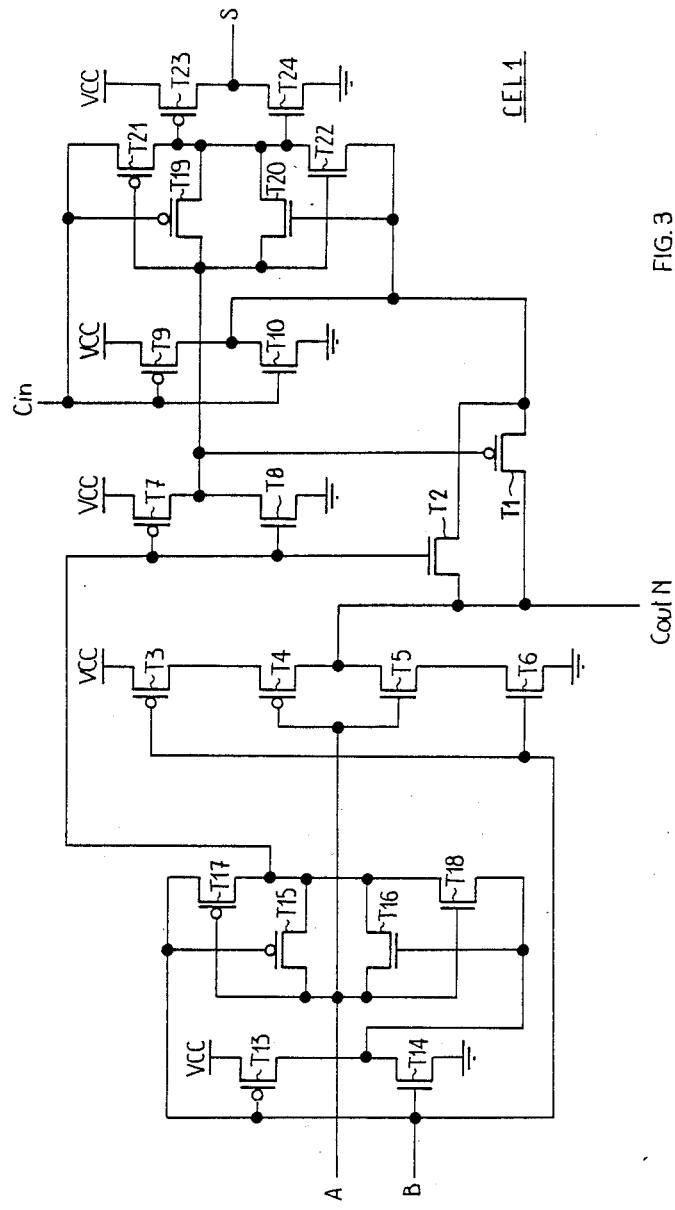
FIG. 3 is a detailed circuit diagram implementing elementary cell CEL1. of FIG. 2.

FIG. 3 shows a detailed circuit embodiment of all the logic gates of the first type of elementary cell CEL1.

In the drawing T1, ... T6 denotes the same transistors as in FIG. 1.

T7 and T8 denote two P and N-channel MOS transistors implementing inverter I2, while T9 and T10 denote two P and N-channel MOS transistors implementing inverter I1.

T15, T17 denote P-MOS transistors, T16, T18 N-MOS transistors implementing EX-OR gate EX2.

T19, T21, denote P-MOS transistors, T20, T22 N-MOS transistors implementing EX-OR gate EX1.

T13, T14 denote P and N-channel MOS transistors implementing inverter I10 (FIG. 2) for complementing operand B. T23 and T24 denote P and N-channel MOS transistors implementing inverter-buffer for the output of result S.

The pair of transistors T7, T8; T9, T10; T13, T14; T23, T24 are likwise interconnected, i.e. have a common gate which is the input, the channels in series between supply voltage Vcc and ground, and the output extracted between the two channels.

T15 and T16 channels are connected in parallel; the input of said channels is connected to the gates of T17, T18 and receives operand A, while the output is connected to junction point of the channels of T17, T18, which are connected in series, and is the output of gate EX2; T15 gate is connected to T17 channel and receives operand B; T16 gate is connected to T18 channel and receives the output of I10 (T13, T14).

T19 and T20 channels are interconnected in parallel; the input of said channels is connected to T21, T22 gates and receives the output of gate I2, while the output is connected to the junction point of T21, T22 channels, which are connected in series, and is the output of gate EX1; T19 gate is connected to T21 channel and receives input carry Cin; T20 gate is connected to T22 channel and receives I1 output.

Gate T13, T14 input is operand B; gate T7, T8 input is EX2 output; gate T23, T24 input is EX1 output. The remaining interconnections have been already listed in relation to FIG. 1.

Figure 4:
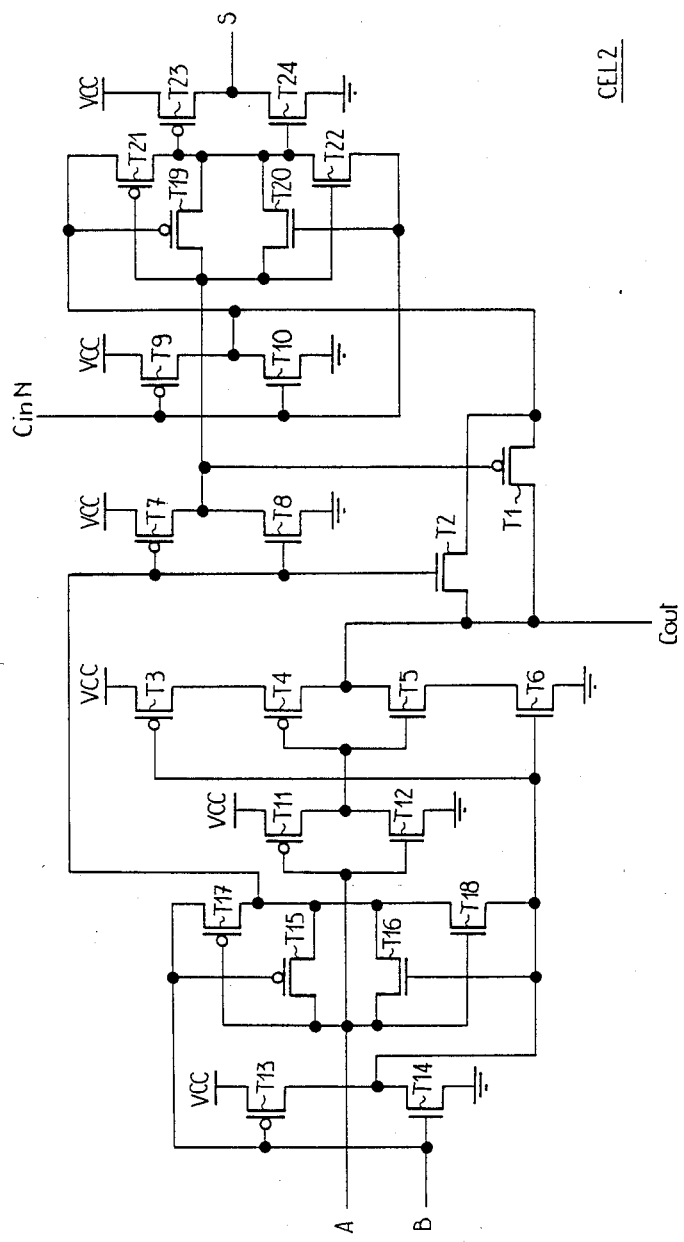
FIG. 4 is a detailed circuit diagram implementing elementary cell CEL2 of FIG. 2.

FIG. 4 shows a detailed circuit embodiment of all the logic gates of the second type of elementary cell CEL2.

Besides the common parts already described in connection with FIG. 3, a first variation consists in sending to T19 gate of EX1 (connected to T21 channel) the output of gate I1 (common point to T9 and T10 channels), while tha input carry Cin is sent to T20 gate (connected to T22 channel). Hence the variation with respect to FIG. 2 scheme consists in the interchange between the two inputs of gate EX1. The second variation consists in supplying T3 and T6 gates with B complemented, present at the output of inverter I12 (FIG. 2), consisting of transistors T13, T14 (which in the cell CEL1 of FIG. 3 form inverter I10) and in supplying T4 and T5 gates with A complemented, present at the output of inverter I11 (FIG. 2) consisting of transistors T11 and T12, respectively P-MOS and N-MOS, connected as T13 and T14.

Figure 2:
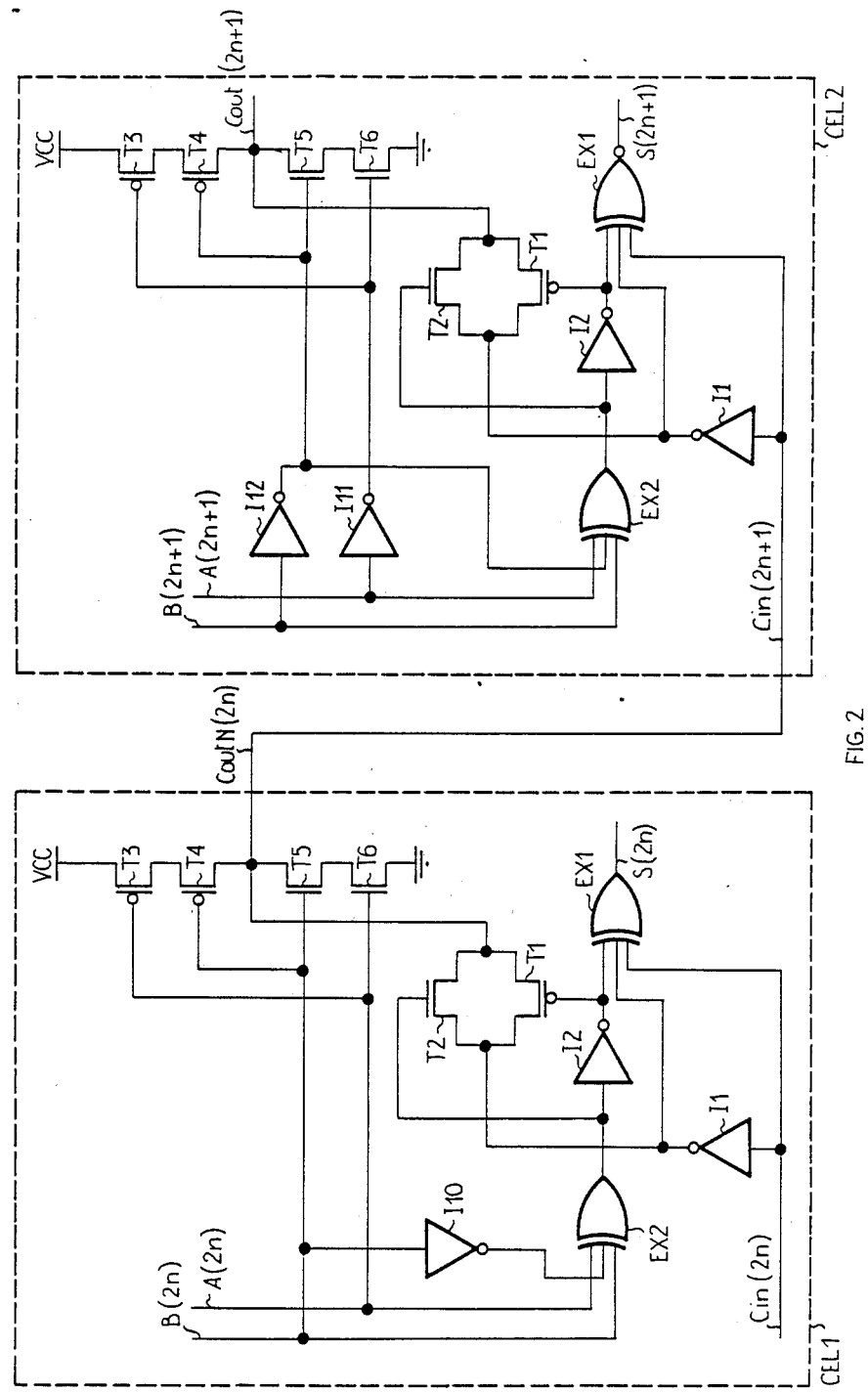
FIG. 2 is a circuit diagram of an embodiment of a pair of contiguous elementary adding cells denoted respectively by CEL1 and CEL2, forming said two embodiments.

The elementary cells shown in FIGS. 2 and 3 can form basic elements of integrated arithmetic logics performing fundamental arithmetic operations such as addition, subtraction, multiplication.

As mentioned, to implement a logic circuit performing the only addition between two operands A, B of size N, it is sufficient to alternately connect cells of CEL1 and CEL2 type so that the carry outgoing from a cell feed the successive, setting the input carry of the first cell Cin(0)=0.

To obtain subtraction also, it is sufficient to add the 1's complement of the subtraend, and add 1 to the addition operation.

Hence beginning with the structure of the adder above, the operand, which can be the subtrahend or an addendum, feeds the first input of N EX-OR gates whose outputs feed one of the two operand inputs of the adder. An addition or subtraction selecting signal, which is 0 for the addition and 1 for the subtraction, is sent to the second input of the EX-OR gates; such a signal is also sent to carry input Cin(0). Thus an adder-subtractor is implemented.

A further example of application of the adding circuit, provided by the invention, is the implementation of a conventional multiplier, e.g. a parallel-parallel type with full-adder cell matrix. To implement the product of two data X(i) and Y(j) of dimensions I and J respectively, available in parallel form, and to obtain a result Z(i,j) still in parallel form, it can be proved that the generic full-adder cell of the multiplier is to carry out the following operation:

$$X(i)Y(j) + Sin + Cin = Sout + Cout$$

where two indexes i, j determine the position of the cell in the matrix, Sin, Cin are the input result and carry, and Sout, Cout are the result and carry generated by the cell. In the matrix structure the result propagates diagonally, while the carry propagates vertically.

The logic product X(i)Y(j), which can be generated by a usual external AND gate, can be sent to an operand input of the adding cell provided by the present invention, while Sin can be supplied to the second operand input; by implementing said external AND gate with a NAND gate followed by an inverter, the latter supplies the true and the complemented values of one of the two operands necessary to said cell, and can hence replace inverter I10 of CEL1 (FIG., 2), or I12 of CEL2.

Inside the multiplier matrix structure CEL1 and CEL2 cells are arranged alternately and along the internal carry propagation lines.

It is clear that the reduction of carry propagation time obtained by using the cells provided by the present invention affects overall computational speed more notably in a multiplier, which has a bidimensional structure, than in an adder-subtractor which has a monodimensional structure.

To give a numerical example of the reduction of maximum delay obtained in such a multiplier, let us consider the known Baugh-Wooley algorithm, allowing the implementation of a parallel-parallel multiplier with 2's complement input and output data (in order to generalize its application also to negative-sign operands): let us consider a 10-bit input X(i) (I=10), a 14-bit input Y(j) (J=14), and a 14-bit output P(k) (K=14). It can be shown that the matrix structure of such a multiplier consists of the following types of cells:

Cell 1: X, Sin+X(j)Y(0)→Cout(j,1)
Cell 2: Sin, Y(0)X(8)→Cout(8,1), YN(0)
Cell 3: X(9)+Sin(8,1)+YN(0)X(9)→Cout(9,1), P(0)
Cell 4: Sin(8,j+1)+YN(j)X(9)+Cin(9,j)-→Cout(9,j+1), P(j)
Cell 5: Sin+Y(12)X(i)+Cin→Cout, Sout, XN(i)
Cell 6: Y(13)XN(0)+Y(13)→Cout, Sout
Cell 7: Y(j)X(0)→Sout
Cell 8: Sin+Y(12)X(8)+Cin→Cout, Sout, XN(8), YN(12)
Cell 9: Sin+Y(j)X(8)+Cin→Cout, Sout, YN(j)
Cell 10: Sin+Y(j)X(i)+Cin→Cout, Sout
Cell 11: Sin+Y(13)XN(i)+Cin→Cout, Sout
Cell 12: YN(13)+Y(13)X(9)+XN(9)+Sin+Cin→P(13)

In said cells XN or YN notation indicates X or Y complemented value. All the types of cells with easy external modifications can be reduced to that of cell 10, which occupies the greater number of central positions in the multiplier, while the other cells are in contour positions. The maximum delay Ttot introduced by said multiplier is:

$$T_{tot} = 21\ tc + 9\ ts$$

where tc is carry propagation time in a cell, while ts is addition propagation time in a cell.

By implementing each cell with a traditional adder scheme, one can obtain:

$$tc = 35\ ns,\ ts = 45\ ns \rightarrow T_{tot} = 1140\ ns$$

By implementing on the contrary each cell according to the present invention in the worst case, in which a unique type of cell is used with an auxiliary inverter on the carry line, it can be obtained $$tc = 8\ ns,\ ts = 10\ ns \rightarrow T_{tot} = 260\ ns$$

If, however, both types of suitably arranged cells are used, a further delay reduction of about 2 ns in the carry propagation time in each cell is attained ($tc \simeq 6$ ns).

We claim:

1. An elementary C-MOS cell for executing logic additions between two operand bits (A,B) with carry propagation, comprising:
   a first EX-OR logic gate (EX2) which receives said operand bits (A,B);
   a first inverter (I1) which receives a carry input (Cin);
   a second inverter (I2) which receives the output of the first EX-OR logic gate (EX2);
   a first transfer gate (T1, T2) which receives at the transfer input the output of said first inverter (I1), and which is controlled by input and output logic levels of said second inverter (I2);
   a second EX-OR logic gate (EX1) which receives input carry (Cin) and the output of said second inverter (I2) and supplies the addition result (S); and
   a first pair of series P-MOS transistors (T3, T4) and a second pair of series N-MOS transistors (T5, T6), said first and second pair being connected in series between two reference voltages, the bit of a first operand (A) being brought to the gate of a transistor of both pairs, the bit of a second operand (B) being brought to the gate of the other transistor of both pairs, the common node of said two pairs being connected to the output of said first transfer gate (T1, T2) and supplying the complemented output carry (CoutN), said first transfer gate consisting of a P-MOS transistor (T1) in parallel with an N-MOS transistor (T2), the input of said second inverter (I2) being sent to the gate of an N-MOS transistor and the output of the second inverter to the gate of a P-MOS transistor of the transfer gate.

2. An elementary cell as in claim 1 wherein said first or second EX-OR logic gates (EX1, EX2) comprise:
   a second transfer gate (T15, T16; T19, T20);
   a first P-MOS transistor (T17; T21) whose channel is connected between an output and a gate of a P-MOS transistor of the second transfer gate; and
   a second N-MOS transistor (T18; T22) whose channel is connected between an output and a gate of an N-MOS transistor of the second transfer gate, an input of the second transfer gate being connected to the gates of said first and second transistors; the transfer input of the second transfer gate being supplied with a first input datum, the transistor gates of the second transfer gate being supplied with the true and complemented values respectively of a second input datum of the logic EX-OR gate, whose output is the transfer output of the second transfer gate.

3. A carry-propagating adding circuit, consisting of elementary cells, one per each pair of operand bits, as defined in claim 2 wherein said cells are cascaded for carry propagation, and said bits of the first and second operands (A, B) are sent to gates of respective transistors of said first and second pairs, true in cells of a first type (CEL1) occupying even positions (2n) and complemented in cells of the second type (CEL2) occupying odd positions (2n+1).

4. An adding circuit as defined in claim 3, wherein in said second logic EX-OR gate (EX1) said input carry (Cin) is supplied true to the gate of P-MOS transistor and complemented to the gate of N-MOS transistor of said second transfer gate, in case of the first type of elementary cell (CEL1), while said input carry (Cin) is supplied complemented to the gate of P-MOS transistor and true to the gate of N-MOS transistor of said second transfer gate, in case of second type of elementary cell (CEL2).

5. A multiplying circuit of the parallel-parallel type consisting of elementary cells, which implements the product of two units of data X(i) and Y(j) available in parallel form, and obtains a result in parallel form, each elementary cell executing logic additions between two operand bits and comprising:
   a first EX-OR logic gate (EX2) which receives said operand bits (A, B);
   a first inverter (I1) which receives a carry input (Cin);
   a second inverter (I2) which receives the output of the first EX-OR logic gate (EX2);
   a first transfer gate (T1, T2) which receives at the transfer input the output of said first inverter (I1), and which is controlled by input and output logic levels of said second inverter (I2);

a second EX-OR logic gate (EX1) which receives input carry (Cin) and the output of said second inverter (I2) and supplies the addition result (S); and a first pair of series P-MOS transistors (T3, T4) and a second pair of series N-MOS transistors (T5, T6), said first and second pair being connected in series between two reference voltages, the bit of a first operand (A) being brought to the gate of a transistor of both pairs, the bit of a second operand (B) being brought to the gate of the other transistor of both pairs, the common node of said two pairs being connected to the output of said first transfer gate (T1, T2) and supplying the complemented output carry (CoutN), said cells being matrix-connected, at the input of each cell being present a NAND gate, the inputs of which receiving said two units of data X(i) and Y(j) of the corresponding position in the matrix, followed by a third inverter feeding one of the two operand inputs of the cell, the second input of each cell receiving the result output of the upstream cell receiving the result output of the upstream cell relevant to the propagation direction of the result, the carry input (Cin) of each cell receiving the output carry (Cout) of the upstream cell relevant to the carry signal path.

6. A multiplying circuit as defined in claim 5 wherein in said carry signal path there are alternately used cells of first (CEL1) and second (CEL2) types, and in that the input and output of said third inverter are supplied to the gates of the transistors of the second transfer gate (T15, T16) of said first EX-OR logic gate (EX2), said cells being cascaded for carry propagation, and said bits of the first and second operands (A, B) are sent to gates of respective transistors of said first and second pairs, true in cells of the first type (CEL1) occupying even positions (2n) and complemented in cells of the second type (CEL2) occupying odd positions (2n+1).

7. A multiplying circuit as defined in claim 6 wherein in said first EX-OR logic gate (EX2), in case of an elementary cell of the first type (CEL1), the gate of P-MOS transistor of said second transfer gate is supplied with the input of the third inverter and the gate of N-MOS transistor with the output of the third inverter, while in case of elementary cell of the second type (CEL2), the gate of P-MOS transistor of said second transfer gate is supplied with the output of the third inverter and the gate of N-MOS transistor with the input of the third inverter.

* * * * *